Figures 1, 2:
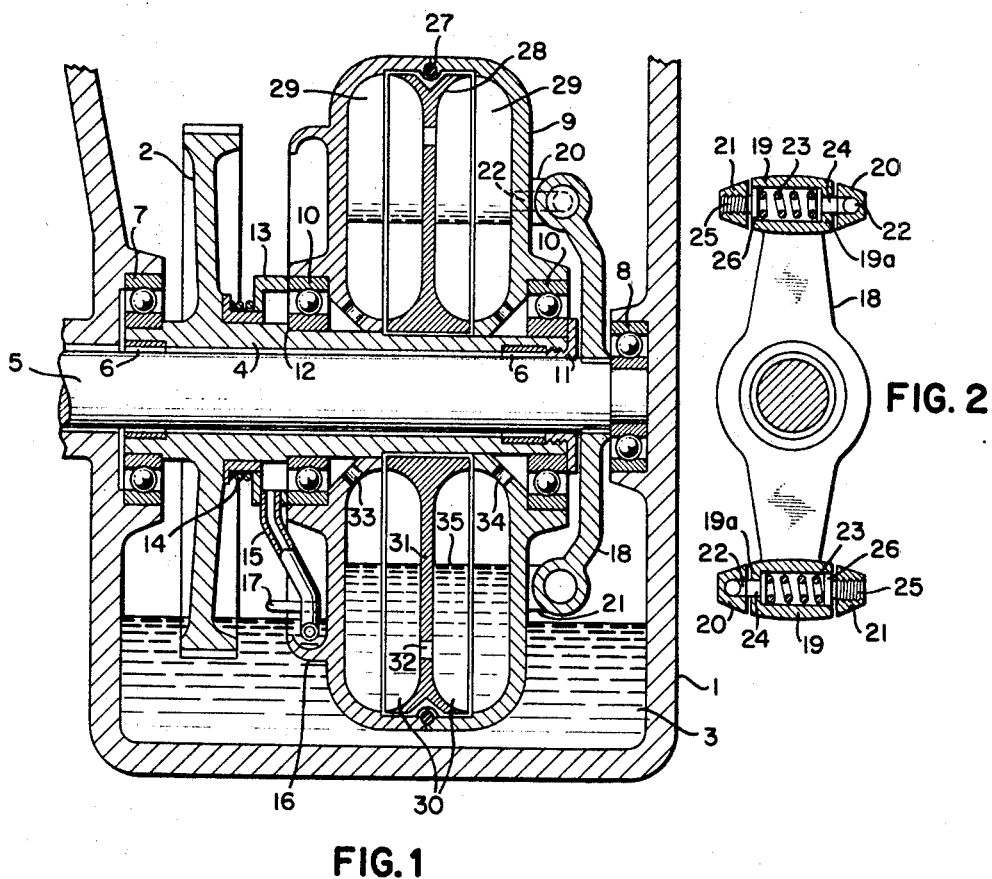

United States Patent

[11] 3,581,502

| [72] | Inventor | Henric Wilhelm Thylefors<br>Stockholm, Sweden |
|---|---|---|
| [21] | Appl. No. | 858,356 |
| [22] | Filed | Sept. 16, 1969 |
| [45] | Patented | June 1, 1971 |
| [73] | Assignee | Alfa-Laval AB<br>Tumba, Sweden |
| [32] | Priority | Oct. 15, 1968 |
| [33] | | Sweden |
| [31] | | 13857/1968 |

[54] COUPLING FOR ROTARY DRIVE
6 Claims, 2 Drawing Figs.

[52] U.S. Cl. ................................................. 60/54
[51] Int. Cl. ....................................... F16h 41/04
[50] Field of Search ................................ 60/54

[56] References Cited
UNITED STATES PATENTS

| 2,423,812 | 7/1947 | Karl et al. | 60/54 |
| 3,362,162 | 1/1968 | Willmer | 60/54 |
| 3,363,417 | 1/1968 | Becker | 60/54 |

Primary Examiner—Edgar W. Geoghegan
Attorney—Davis, Hoxie, Faithfull & Hapgood

ABSTRACT: A rotary housing of the coupling encloses a liquid for transmitting force between driving and driven shafts and is inserted in a gear housing. The coupling is provided with a pump for continuously pumping oil from the gear housing into the coupling housing, and the latter has an outlet for continuously discharging oil to the gear housing.

PATENTED JUN 1 1971 3,581,502

INVENTOR.
HENRIC WILHELM THYLEFORS

COUPLING FOR ROTARY DRIVE

The present invention relates to couplings of the type having a liquid enclosed in a rotary housing and serving as a force transmitting medium between a driving and a driven shaft.

At the start of operation and also to certain degree during the continued operation of couplings of this type, heat is developed in the coupling housing due to sliding of the liquid therein between driving and driven parts. For this reason, it has been necessary to provide the coupling housing with sufficiently large outer cooling surfaces including cooling flanges, for conducting away the heat of friction developed in the liquid. These cooling requirements have resulted in a coupling housing which is bulky and cumbersome.

The present invention makes it possible to reduce the space requirements of the coupling housing while providing effective cooling of the liquid in the coupling housing. For this purpose, advantage is taken of the fact that the oil bath in the gear housing of a machine has an ample size, and that the gear housing and the cooperating parts have a great cooling capacity. More particularly, the invention is characterized in that the coupling housing is put into the gear housing, the coupling is provided with a pump for continuously pumping gear housing oil into the coupling housing, and the latter is provided with an outlet for continuously discharging the same oil into the gear housing.

With this arrangement, the gear housing oil will circulate through the coupling housing at the start as well as during the operation of the machine, and the oil intensely heated at the start in the coupling housing will utilize the great cooling capacity of the gear housing. The invention is suited for use in the operation of centrifugal separators, where the coupling between the motor and the gear is subjected to heavy loads while the large masses are brought to a high speed of rotation.

The gear housing oil can be pumped into the coupling housing by any suitable arrangement. According to one embodiment of the present invention, the pump comprises an annular groove arranged on the outside of the coupling housing in concentric relation thereto and immersed at its lower part in the gear housing oil, and a paring tube operable to feed oil from the groove into the coupling housing.

The present invention also makes it possible to effect a protection against overload of the coupling, in that the force-transmitting means between the driving shaft and the coupling housing is arranged to be pressed in a sealing manner with a maximum force against an outlet situated radially outside the outlet from the coupling housing. In principle, this maximum force can be generated by means of a suitable weight system; but according to a preferred embodiment of the invention, a spring is utilized to generate this maximum force. Different springs can be used for different degrees of protection against overload, or a single spring may be provided with means for adjusting its compression or other biasing.

In order to make feeding of oil into the coupling housing possible without counterpressure, this housing is provided with an inlet, located closer to the axis of rotation than the aforesaid radially outer outlet.

An additional advantage of the invention is the fact that all leakage from the coupling can be caught by the gear housing, so that soiling of the surroundings of the coupling is avoided.

The invention is explained more in detail below with reference to the accompanying drawing, which shows an embodiment of the present coupling chosen as an example. In the drawing, FIG. 1 is an axial sectional view of the coupling; FIG. 2 is a view of the force transmitting double-lever, shown partly in section, as seen from the right in FIG. 1.

Referring to the drawing, a gear housing 1 contains a gear wheel 2 forming part of the gearing and extending down into an oil bath 3. The gear wheel 2 is carried by and rotates with a hollow shaft 4. A shaft 5 driven by a motor (not shown) extends into this gear wheel shaft 4, which is journaled on the shaft 5 by two roller bearings 6 and in the gear housing by a ball bearing 7. The right-hand end of the shaft 5 is journaled in the gear housing by a ball bearing 8.

A coupling housing 9 is journaled on the hollow shaft by two ball bearings 10. The coupling housing is retained axially on the shaft 4 by means of a flanged sleeve 11. This sleeve is screwed into the right-hand end of the shaft 4 and presses the coupling housing 9 against a shoulder 12 on shaft 4. A bowl-shaped part 13 is pressed by a spring 14 against the left-hand ball bearing 10. A paring tube 15 opening to this part 13 pumps oil from an annular groove 16 arranged on the outside of the coupling housing. Rotation of paring tube 15 and the part 13 is prevented by means of a stop 17 fixed to the inside of the gear housing 1. A double-lever 18 is splined to the shaft 5 at its right-hand end and transmits the driving force of shaft 5 to the coupling housing 9. The lever 18 cooperates at each end 19 with two shoulders 20 and 21 secured to the outside of the coupling housing. A channel 22 bent at right angles opens into each shoulder 20 and communicates with the interior of the coupling housing 9. A spring 23 presses a pin 24 toward the opening of the channel 22 in each shoulder 20, so that this opening is kept closed. A disc 26 can be pressed by means of a screw 25 against each spring 23, so that a compression corresponding to the desired protection against overload is imparted to this spring.

The coupling housing 9 comprises two halves which are sealed against each other by means of a gasket 27 and are clamped together by the sleeve 11. In the coupling housing is a wheel 28 which is splined to the hollow shaft 4. The coupling housing 9 has a plurality of radial vanes 29 on both sides of the wheel 28 within the coupling housing, and the wheel 28 also has a plurality of radial vanes 30 on both sides of a central disc 31 which extends from the wheel nave. The disc 31 has a plurality of holes 32, which effect communication between the two halves of the coupling housing. Finally, the coupling housing has an inlet 33 and an outlet 34 for the gear housing oil, which as shown forms a level 35 in the coupling housing.

In the operation of the device, the shaft 5 driven by the motor drives the lever 18 counterclockwise (FIG. 2) in the direction towards the shoulders 21 and thus drives the coupling housing 9. Oil entrained by the groove 16 in its rotation is pumped by the stationary paring tube 15 into the interior of the bowl-shaped part 13 and flows from the latter through the left-hand ball bearing 10 and the inlet 33 into the left-hand half of the coupling housing 9, and thence through the holes 32 into the right-hand half of the coupling housing. The vanes 29 bring the oil into rotation and this rotary movement of the oil acts upon the vanes 30 of the wheel 28 so that the latter is also brought into rotation and, through hollow shaft 4, drives the gear wheel 2. During the acceleration of the wheel 28, the oil slides while causing a corresponding generation of heat. The channels 22 are arranged at a level where the transmission effect will be so low that there can be no risk of overloading the coupling. When the oil level is displaced radially inward to the outlet 34, the force-transmitting capability of the coupling is increased. If the machine is then loaded more than the springs 23 allow, the lever ends 19 are pressed against the shoulders 21 so that the clearance between these lever ends and the shoulders 20 is increased. As a result, the flanges 19a of the lever ends 19 seize the head of each pin 24 and pull it away from the opening of the channel 22 in the shoulder 20, so that oil discharges into the gear housing 1 through this opening. An automatic limitation of the torque transmitted by lever 18 is thus obtained, which prevents overload of the coupling. When the oil level in the coupling housing reaches the outlet 34, oil flows through the right-hand ball bearing 10 and discharges into the gear housing 1. In this way, oil cooled in the gear housing 1 is continuously flushed through the coupling housing 9, whereby an effective conduction of heat from the coupling housing is obtained.

I claim:

1. In combination with a driving member and a member to be driven, a coupling comprising a housing mounted for rotation about an axis, a liquid enclosed in said rotary housing and serving as a force-transmitting medium between said driving and driven members, a pump associated with the rotary housing for pumping liquid into said housing, the housing having first and second outlets for the liquid, and force-transmitting means through which said driving member drives the rotary housing and including an element biased against said second outlet to close the same, said transmitting means being operable through said element to open said second outlet when the force transmitted by said means exceeds a predetermined maximum.

2. A coupling according to claim 1, in which said second outlet is located at a greater radius from said axis than the first outlet.

3. A coupling according to claim 1, in which the force-transmitting means includes a spring biasing said element against said second outlet.

4. A coupling according to claim 3, comprising also means for adjusting the biasing action of said spring.

5. A coupling according to claim 1, in which the force-transmitting means includes a spring biasing said element against said second outlet and through which the force is transmitted by said means.

6. A coupling according to claim 1, in which the rotary housing has an inlet for the liquid form said pump, said inlet being located at a smaller radius from said axis than said second outlet.